United States Patent
Brooks et al.

(10) Patent No.: US 11,190,925 B2
(45) Date of Patent: Nov. 30, 2021

(54) MOBILE DEVICE GEOFENCING FOR WIRELESS EMERGENCY ALERT MESSAGES

(71) Applicant: T-Mobile USA, Inc., Bellevue, WA (US)

(72) Inventors: Terri L. Brooks, Prosper, TX (US); Wei-Ming Lan, Morrisville, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/850,983

(22) Filed: Apr. 16, 2020

(65) Prior Publication Data

US 2021/0329438 A1 Oct. 21, 2021

(51) Int. Cl.
| | |
|---|---|
| *H04W 4/90* | (2018.01) |
| *H04W 4/12* | (2009.01) |
| *H04W 4/021* | (2018.01) |
| *H04W 4/029* | (2018.01) |

(52) U.S. Cl.
CPC .............. *H04W 4/90* (2018.02); *H04W 4/021* (2013.01); *H04W 4/029* (2018.02); *H04W 4/12* (2013.01)

(58) Field of Classification Search
CPC ....... H04W 4/90; H04W 4/025; H04W 4/029; H04W 4/02; H04W 4/021; H04W 4/06; H04W 64/00; H04W 76/40; H04W 76/50; H04W 8/005; H04W 4/12; G08B 21/10; G08B 27/001; G08B 27/006; G06F 21/44; G06F 2221/2111
See application file for complete search history.

(56) References Cited

U.S. PATENT DOCUMENTS

| | | | | |
|---|---|---|---|---|
| 9,398,619 | B1 * | 7/2016 | Sennett | H04W 4/021 |
| 2005/0246728 | A1 * | 11/2005 | Cundiff, Sr. | G11B 7/0037 |
| | | | | 720/660 |
| 2006/0070787 | A1 * | 4/2006 | Bartels | G01S 13/931 |
| | | | | 180/271 |
| 2007/0149167 | A1 * | 6/2007 | Lee | H04W 4/029 |
| | | | | 455/404.2 |
| 2015/0011227 | A1 * | 1/2015 | Wellington | H04W 24/02 |
| | | | | 455/446 |
| 2015/0147995 | A1 * | 5/2015 | Bontu | H04W 4/02 |
| | | | | 455/404.1 |

(Continued)

*Primary Examiner* — Jean A Gelin
(74) *Attorney, Agent, or Firm* — Lee & Hayes, P.C.

(57) ABSTRACT

Mobile networks may be configured to broadcast wireless emergency alert (WEA) messages to receiving mobile devices. A mobile device within the network may receive a WEA message including data defining a geographic region associated with the message. Using the data defining the geographic region for the WEA message, the mobile device may perform location-based geofencing techniques to determine whether to present a notification in response to the WEA message. In various examples, a mobile device may calculate an offset distance based on a transgression parameter and may determine a second geographic region using the offset distance. The mobile device also may determine its current location and compare the location to the second geographic region to determine whether to present the WEA message, thereby limiting and/or minimizing the negative effects of potential undershoot and overshoot errors caused by inaccurate location determinations by mobile devices.

17 Claims, 7 Drawing Sheets

(56) References Cited

U.S. PATENT DOCUMENTS

| | | | | |
|---|---|---|---|---|
| 2016/0040999 A1* | 2/2016 | Bouve | ............... | G08G 1/0129 |
| | | | | 701/465 |
| 2016/0304028 A1* | 10/2016 | Hathaway | ............... | G08G 1/162 |
| 2017/0019777 A1* | 1/2017 | Cole, Jr. | ............... | H04W 4/029 |
| 2018/0160267 A1* | 6/2018 | Immendorf | ............... | H04W 48/10 |
| 2019/0253842 A1* | 8/2019 | Rao | ............... | H04W 4/029 |
| 2019/0389373 A1* | 12/2019 | Erdl | ............... | B60Q 3/80 |
| 2020/0128646 A1* | 4/2020 | Sinha | ............... | H05B 45/20 |
| 2020/0135005 A1* | 4/2020 | Katz | ............... | G08B 19/00 |
| 2020/0154257 A1* | 5/2020 | Kim | ............... | H04H 20/57 |
| 2020/0252780 A1* | 8/2020 | McClendon, IV | ............... | H04W 4/90 |
| 2021/0035442 A1* | 2/2021 | Baig | ............... | G06K 9/00791 |

\* cited by examiner

MOBILE DEVICE GEOFENCING FOR WIRELESS EMERGENCY ALERT MESSAGES

BACKGROUND

The Wireless Emergency Alert (WEA) system has been established for broadcasting alert messages to mobile devices. Alert messages may be generated by local, state, and national agencies such as emergency management authorities, law enforcement agencies, weather services, etc.

Alert messages can be specific to different geographic regions and may contain text warnings regarding immediate hazards or emergencies in those regions. Examples of WEA messages include notifications of serious weather events, evacuation notices, missing person notices (e.g., AMBER alerts), or "Presidential" alerts regarding national emergencies. Presentation of WEA alert messages to mobile users includes display of the alert text, audible alerting and/or vibration (visual, auditory, touch). WEA alert messages may display information regarding the type of hazard or emergency, the geographic location associated with the hazard or emergency, any actions that should be taken, and the agency that issued the alert.

A WEA system may broadcast a WEA message to a group of mobile devices within the geographic region affected by the hazard or emergency. When a mobile device receives a WEA message, it may present the message via the display screen and other output components of the device. Users of mobile devices can decline to receive certain types of WEA messages. For instance, a mobile device that supports WEA messages may include configuration settings, accessible through a graphical user interface (GUI), that allows the user to enable or disable WEA messages for different message types.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
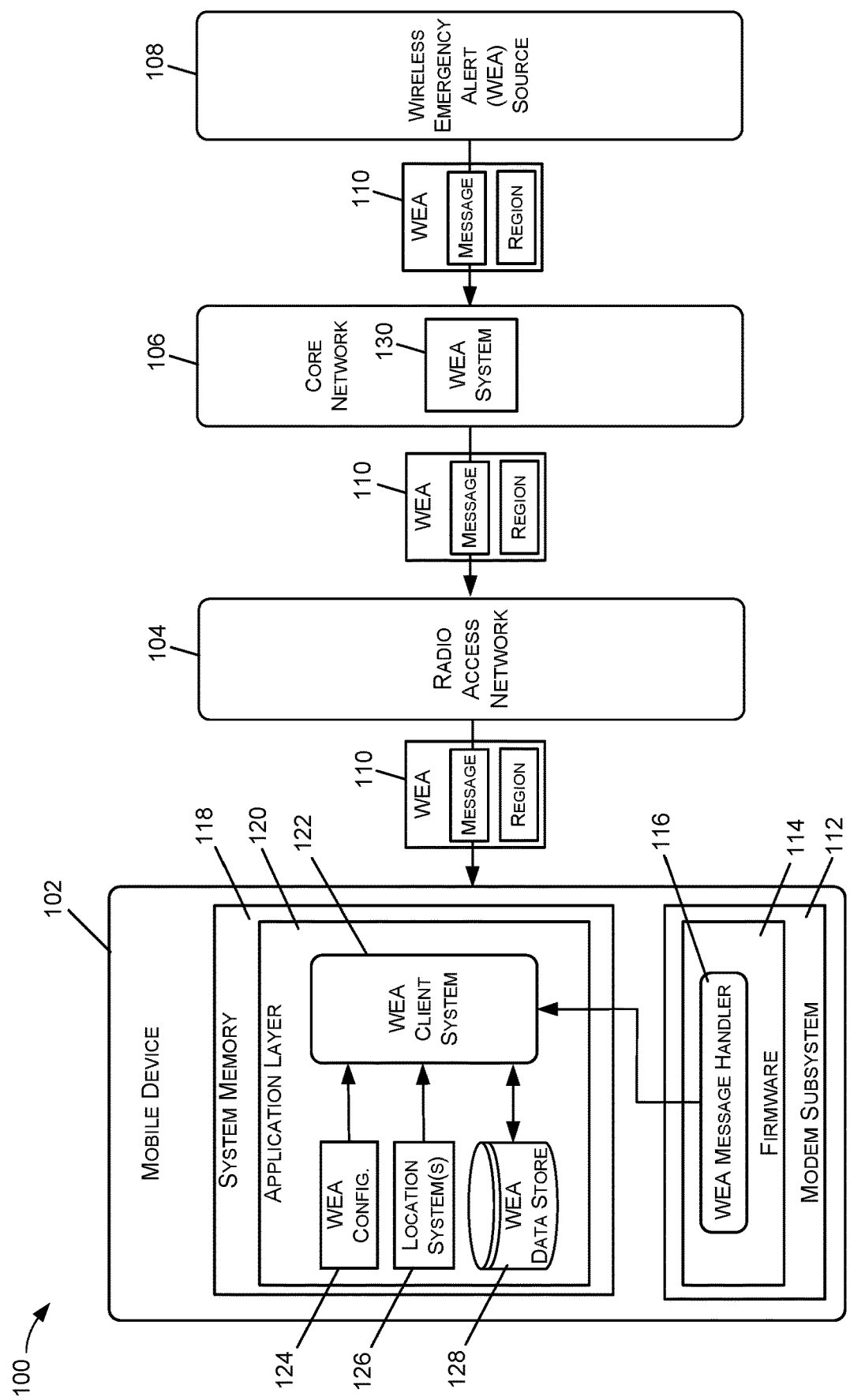
FIG. 1 is a block diagram illustrating components of a mobile device and computing environment for transmitting wireless alert messages, in which certain techniques described herein may be implemented.

This disclosure describes techniques for transmitting Wireless Emergency Alert (WEA) messages by WEA systems, as well as techniques for processing and presenting WEA messages using location-based geofencing techniques performed by mobile devices. A WEA system within a mobile network may receive a WEA message from a WEA source, including data identifying a geographic region associated with the message. The WEA system may compare the geographic region to a sector map of the mobile network to determine the cell sectors to which WEA system will broadcast the alert. The WEA system may broadcast the message to mobile devices to the cell sectors overlapping the geographic region associated with the message.

The WEA messages broadcast by the WEA system may be received by mobile devices within the cell sectors of the mobile network to which the message was broadcasted. A mobile device may receive a WEA message, and data defining the geographic region associated with the message. Using the data defining the geographic region of the WEA message, and an offset distance, the mobile device may determine a second geographic region associated with the message. For instance, the second geographic region may be a larger region encompassing the geographic region associated with the WEA message, where the boundaries of the two regions are separated by the offset distance. The mobile device may determine its current location using one or more locating techniques, such as GPS-based location and/or cellular location technologies. After determining its current location, the mobile device may determine whether or not is it within the larger second geographic region, and may present the WEA message when determining that it is within the second geographic region. Accordingly, techniques described herein include intelligent mobile device geofencing, in which a mobile device determines whether to present a received WEA message based on the current location of the mobile device and data identifying a geographic region associated with the WEA message.

The techniques and systems described herein may improve the operation of WEA systems and the functioning of mobile devices with respect to handling and presenting WEA messages. For example, in WEA systems configured to present WEA messages to only those mobile devices within a specific geographic region, problems may arise when mobile devices incorrectly calculate their locations. For instance, a first mobile device located outside the defined geographic region for the WEA message may incorrectly calculate its position as being inside the geographic region, and may improperly present the WEA message as a result. Similarly, a second mobile device located inside the defined geographic region may incorrectly calculate its position as being outside the geographic region, and may improperly determine that the WEA message should not be presented as a result. These problems may be characterized as overshoot (e.g., presenting a WEA message on devices outside the associated geographic region) and undershoot (e.g., failing to present WEA message on devices inside the associated geographic region), and both problems may negatively impact WEA systems that rely on mobile devices to perform location determinations.

To address these problems, the techniques and systems described herein may use an offset distance to limit or minimize the negative effects of undershoot and overshoot when providing WEA messages at mobile devices. As noted above, undershoot may cause mobile devices within the defined geographic region for a WEA message not to present the message, while overshoot may cause mobile devices to within the defined geographic region to improperly present the message. In some examples, a transgression parameter may define a permissible overshoot distance for a WEA message. For instance, if the defined geographic region for a WEA message is a circle with a two-mile radius around a center point and the transgression parameter is one mile, then mobile devices within the two-mile radius should present the WEA message, mobile devices between two and three miles from the center point need not but may permissibly present the WEA message, and mobile devices outside of the three-mile radius from the center point should not present the WEA message. In this example, the mobile device may compute an offset distance less than the distance of the transgression parameter (e.g., half of the transgression parameter, or 0.5 miles) to reduce or minimize errors caused by undershoot and overshoot. In some cases, the mobile device may compute the offset distances as one-half of the transgression parameter distance based on an assumption that location errors by the mobile devices are equally likely in all directions, or, on average based on field experience, are less than half of the transgression parameter in a high percentage of cases. In such cases, by selecting an offset distance that corresponds to the midpoint between the outer boundary of the defined geographic region for the WEA message and the boundary for larger second geographic region (e.g., the geographic region for the WEA message plus the transgression parameter distance), the mobile device may minimize the total number of overshoot and undershoot errors.

As these examples illustrate, the techniques and systems described herein may improve the functioning of WEA systems broadcasting WEA messages and/or the functioning of mobile devices receiving and presenting WEA messages. For example, within a WEA system broadcasting WEA messages, various techniques described herein may improve the information conveyed in the broadcast and/or the directions provided to the mobile devices via the broadcast. Additionally, various techniques described herein may improve the functioning of the mobile devices by performing geofencing at the mobile device to selectively present WEA messages based on the current location of the mobile device and other factors. The WEA system and the mobile devices within the network may collaborate so that WEA messages are transmitted to and presented only by the mobile devices within the defined geographic region(s) for the WEA message plus the transgression distance, wherein the geographic region(s) may be of any size, shape, and location. Additionally, techniques described herein may improve the functioning of the WEA system and mobile devices by reducing and/or minimizing the number of undershoot and overshoot errors, so that fewer mobile devices present WEA messages not intended for those devices, and fewer mobile devices fail to present WEA messages intended for those devices.

In some implementations, a WEA system and/or mobile device may calculate larger or smaller offset distances, based on a determination that the negative effects of undershoot errors and the negative effects of overshoot errors are not equal. For example, if an overshoot error (e.g., presenting the message at a mobile device outside the defined geographic region by more than transgression parameter distance) is determined to have a larger negative effect than an undershoot error (e.g., failing to present the message at a mobile device within the geographic region), then the mobile device may update the calculation to decrease the offset distance so fewer instances of overshoot occur. In contrast, if an undershoot error is determined to have a larger negative effect, then the mobile device may update the calculation to increase the offset distance so that fewer instances of undershoot occur.

Mobile devices also may determine confidence values and/or confidence ranges associated with the device location determinations. Confidence values and confidence ranges may represent a likelihood that the mobile device is within a distance range of the current location determined by the mobile device. As an example, a first location calculation may have a 90% confidence range of 5 meters, indicating a 90% likelihood that the mobile device is within 5 meters of the calculated location. As another example, a second location calculation may have a 90% confidence range of 50 meters, indicating a 90% likelihood that the mobile device is within 50 meters of the calculated location. The mobile device may determine confidence values and/or ranges based on the mobile locating techniques used (e.g., GPS or cellular location technologies, etc.) and/or the quality of the locating techniques (e.g., number of satellite signals received, number of access networks available, signal strength and data consistency, etc.). In some implementations, the mobile device may use the confidence values and/or ranges to calculate the offset distance used to determine whether the mobile device should present a WEA message 110.

In some examples, when a mobile device receives and presents a WEA message associated with a geographic region, the mobile device may store a message identifier and/or data identifying the message. For instance, when a mobile device receives a new (e.g., not duplicate) WEA message associated with coordinates defining a geographic region but does not present the alert due to its current location, the mobile device may store not only the message identifier, serial number, and all associated presentation information, but also may store the received coordinates. These additional techniques may further improve the functioning of WEA systems and mobile devices in scenarios when WEA messages are repeatedly broadcast by WEA sources and/or WEA systems to the mobile devices. For instance, when a mobile device changes locations between different broadcasts of the same WEA message, the mobile device may move from a location outside of the geographic region associated with the message to a location inside the geographic region, or vice versa. By tracking the message identifiers of the WEA messages that have been both received and present by the mobile device, the mobile device may ensure more effectively that duplicate WEA messages are presented as the mobile device moves in and out of the geographic region associated with the message. Additionally, if a mobile device that has not previously presented the alert later receives a WEA Handset Action Message (WHAM) directing the mobile to reprocess an alert or list of alerts identified by a unique Message ID/Serial Number pair, the same location comparison technique described herein can be used to limit overshoot and undershoot in the same manner as it would for the comparison performed upon initial receipt of the alert.

Further, the functioning of WEA systems and mobile devices may be improved by supporting defined geographic regions for WEA messages having any shape, size, and location. Using the systems and techniques described herein, a WEA message may include data defining one or more geographic regions associated with the message. The geographic region(s) defined for a WEA message may include one or more polygonal or non-polygonal shapes of any size and location, regardless of the configuration of the cellular site sectors of the mobile network. The WEA system may broadcast the WEA message to mobile devices within the cellular site sectors overlapping the geographic region(s) defined for the WEA message, and the mobile devices receiving the WEA message may use the geofencing techniques described herein to selectively present the WEA message based on the defined geographic region for the WEA message, the determined offset distance, and the current location of the mobile device.

FIG. 1 illustrates an example environment 100 within which certain techniques described herein may be implemented. In FIG. 1, a mobile device 102 (which also may be referred to as a wireless communication device, user equipment (UE), or a mobile station (MS)), communicates through a radio access network (RAN) 104 with a core network 106 of a cellular communication system (which also may be referred to as a mobile network).

The mobile device 102 may comprise any type of device capable of wireless communication with the core network 106 and/or other components. For example, the mobile device 102 may comprise a cell phone, a smartphone, a computer, a laptop, a tablet computer, smart watch or other wearable computing device, or any other device capable of presenting emergency alert messages and associated messages. The mobile device 102 is an example of many such devices that may be used within a wireless communication network (or mobile network).

The radio access network (RAN) 104 may use any type of wireless communication technology, including $3^{rd}$ Generation (3G), $4^{th}$ Generation (4G), and $5^{th}$ Generation radio access technologies. For example, the RAN 104 may be implemented by a 3G, 4G, or 5G base station or access point. The RAN 104 typically comprises multiple base stations distributed over a large geographic region, such as a country, to serve many devices.

The core network 106 may comprise, by way of example, a Long-Term Evolution (LTE) network or a 5G network. The systems and techniques described herein also may be used in conjunction other types of networks, such as Universal Mobile Telecommunications Service (UMTS) and Global System for Mobile communications (GSM) networks.

As shown in FIG. 1, environment 100 includes a wireless emergency alert (WEA) source 108 that provides wireless emergency alert (WEA) messages, and a WEA message 110 is shown in this example. The WEA source 108 provides WEA messages 110 to the WEA system 130 within the core network 106, for one-way broadcast over the RAN 104 to receiving devices such as the mobile device 102. The systems and techniques described herein may use wireless emergency alert (WEA) messages that are generated and broadcast using standards and techniques established for this purpose, including but not limited to the WEA 3.0 standards including geo-targeted WEA alert messages.

The WEA source 108 may include components configured to receive, generate, format, and transmit WEA messages 110 to the WEA system 130, for broadcasting to mobile devices 102. WEA messages may be initially generated by alerting authorities and provided to a message aggregator (e.g., the Federal Emergency Management Agency (FEMA) Integrated Public Alert and Warning System (IPAWS)). The message aggregator may receive alert messages from alerting authorities and forward the messages to alert disseminators such as one or more wireless communication providers. Wireless communication providers may use a WEA system 130 within the core network 106 to broadcast WEA messages 110 via their core networks 106 and RANs 104. Mobile devices 102 may receive the one-way message transmissions and present the specified messages, if appropriate in light of device configuration settings and conditions. In some examples, individual WEA messages may be broadcast repeatedly by the WEA source 108 until the message is no longer relevant. Multiple broadcasts of the WEA message may ensure that the message is received by as many mobile devices 102 as possible.

It should be understood that FIG. 1 illustrates a simplified example of a computing environment and architecture for a Wireless Emergency Alerting (WEA) System, and that certain components have been omitted for clarity and so as not to obstruct the other components depicted. However, the systems and techniques described herein may apply to various other WEA systems and computing architectures as well. For instance, in some examples the WEA system 130 may be implemented at the entry point in the gateway (GW) and cellular broadcast center (CBC) platform (GW/CBC platform) of the commercial mobile service provider (CMSP), which may be positioned between the WEA source 108 and the core network 106. In such examples, the WEA system 130 receives the WEA message 110 after verification by FEMA IPAWS, determines the cell site sectors as described herein, and then passes the message 110 to the core network 106. Additionally, the message format sent by the alert originators in the WEA source 108 may be reformatted by a FEMA system before being received at the WEA system 130 (e.g., the CMSP GW/CBC platform), and then the WEA system 130 may create the geographic coordinates associated with the alert as part of the overall alert information element that is broadcast over the air.

WEA message 110 includes message text and/or other message content (e.g., images, video, web-based links, interactive content, etc.) that is to be displayed or rendered by mobile devices 102 when presenting the message 110. Additionally, in some examples, a WEA message 110 also may include various metadata, such as a message identifier (ID), a serial number associated with the message 110, and/or a timestamp of the message 110. As shown in this example, the metadata for a WEA message 110 also may include data defining a geographic region associated with the message 110. The geographic region associated with a WEA message 110 may define an area of relevance for the WEA message 110, within which mobile devices 102 may present the message 110, and outside of which mobile devices 102 may disregard and not present the message 110. In some examples, the metadata defining a geographic region for a WEA message 110 may comprise a set of coordinates defining the boundaries of the geographic region. The geographic region may be of any size, location, and shape, including polygonal or non-polygonal shapes. For polygonal shapes, the region metadata within the WEA message 110 may include data identifying the coordinates of the ordered set of vertices defining the polygon. For non-polygonal shapes, such as circles, semi-circles, ellipses, and free form shapes, the region metadata within the WEA message 110 may include appropriate data defining the shape. For instance, within the WEA message 110, a circular geographic region may be defined by the coordinates of the center point of the circle and its radius value, an elliptical geographic region may be defined by the coordinates of its foci and the sum of the distances from the boundary points to the foci, etc.

Although in this example the data defining the geographic region is transmitted as metadata within the WEA message 110, in other examples the data defining the geographic region may be transmitted separately from the WEA message 110. For instance, in some examples the mobile device 102 may receive a first WEA message 110 from the WEA source 108 (e.g., via the WEA system 130), and may receive a second message from a separate source system defining the geographic region associated with the first WEA message 110.

Additionally, while the above examples describe a single geographic region associated with the WEA message 110, in other examples a WEA message 110 may have multiple associated geographic regions. For instance, a WEA message 110 including an AMBER alert may be associated with multiple non-overlapping, or overlapping, geographic regions, such as different possible getaway routes, different potential sightings of an abducted victim, etc. In these examples or any case in which a WEA message 110 is associated with multiple overlapping or non-overlapping geographic regions, the WEA message 110 may include the data defining the multiple associated geographic regions, and/or the mobile device 102 may receive the geographic region data via a separate transmission from the WEA system 130 or other WEA source 108.

As shown in FIG. 1, the WEA message 110 is received by the WEA system 130 from the WEA source 108, and then distributed by the WEA system 130 through the core network 106 and the RAN 104 of the mobile network to the mobile device 102. Although a single mobile device 102 is shown in this example, the RAN 104 may broadcast the WEA message 110 via one or more cell site sectors, and any or all of the mobile devices 102 within those sectors may receive the broadcasted WEA message 110. When mobile device 102 receives the WEA message 110, it analyzes the WEA message 110 and determines whether or not the message should be presented on the mobile device 102. As described below in the more detail, the mobile device 102 may use configuration data, location data, and the geographic location within the metadata of the WEA message 110 to determine whether or not the message 110 should be presented on the device 102.

When the WEA message 110 is received by the mobile device 102, it is initially received and processed by a physical-layer component, such as a modem subsystem 112. As shown in this example, the modem subsystem 112 may comprise firmware 114 that controls the operation of the modem subsystem 112. Firmware 114 includes encoded logic that is associated with, implemented by, and/or executed by specific hardware, such as logic embedded within the specialized hardware components of the mobile device 102. In some examples, the modem subsystem 112 may be implemented by one or more integrated circuits or by a System-on-a-Chip (SoC) for mobile devices 102. The firmware 114 of the modem subsystem 112 may include logic for processing RF signals, implementing communication protocols such as LTE and 5G, for performing carrier aggregation, for controlling operations of RF components, RF Integrated Circuits (RFICs), and RF Front Ends (RFFEs) with respect to signals to and from a base station, for interfacing with higher-level software components, etc. The modem subsystem 112 also may perform initial processing of broadcast WEA messages 110 received at the mobile device 102. The firmware 114 of the modem subsystem 112 initially receives broadcast WEA messages 110, performs initial duplication checking (e.g., based on the message identifiers and/or serial numbers of the message metadata), and forwards any new, non-duplicate messages to a WEA client system 122 that resides in the application layer 120 of the system memory 118.

The WEA client system 122 implements functionality for processing WEA messages 110 received from or made available by the firmware 114. As described below in more detail, the WEA client system 122 may use WEA configuration data 124, and/or device location data received from location system(s) 126 to determine whether to present received WEA messages 110. The WEA configuration data 124 may include message presentation criteria based on device conditions, device configuration settings, and/or other device properties. For instance, WEA configuration data 124 may be defined on the mobile device 102 to enable or disable all WEA messages 110, or certain specific types of WEA messages 110. Additional WEA configuration data 124 may enable or disable WEA messages 110 based on the date and/or time at which the message is received, the current user of the mobile device 102, or based on any other criteria associated with the mobile device 102, device user, or the WEA message 110.

Additionally or alternatively, the WEA client system 122 may determine whether or not to present a WEA message 110 by comparing the geographic region(s) associated with the WEA message 110 to the current location of the mobile device 102. For example, the mobile device 102 may receive device location data from location systems(s) 126, and may use the device location data and the geographic region associated with the WEA message 110 to determine whether or not to present the WEA message 110. The various location-based geofencing techniques used by the WEA client system 122 to determine whether to present WEA messages 110 described in greater detail below.

When the WEA message 110 is received from the WEA message handler 116 within the firmware 114, the WEA client system 122 evaluates the message 110 based on the WEA configuration data 124 and/or geofencing techniques described herein, to determine whether to present a notification regarding the WEA message 110. If the WEA client system 122 determines that the various criteria are satisfied by the WEA message 110, the WEA client system 122 outputs a notification on the mobile device 102 for viewing by a user of the mobile device 102. Outputting a notification based on a WEA message 110 may include generating and presenting a notification on the mobile device 102 including the text and/or other content of the WEA message 110. The notification may comprise a visible notification, audible notification, and/or vibratory notification. In some examples, the notification for a WEA message 110 may include automatically displaying the text of the alert message on the display screen of the mobile device 102, while in other examples the mobile device 102 may display the message text only after a device user selects or otherwise opens the notification.

In some examples, the WEA client system 122 may include duplication checking functionality to prevent the presenting of multiple notifications for a single WEA message 110. As noted above, a WEA source 108 may repeatedly broadcast a WEA message 110 to an associated geographic region until the message 110 is no longer relevant. To implement the duplication checking functionality, the WEA client system 122 may store data in a WEA data store 128 identifying the WEA messages 110 received by the mobile device 102 and for which notifications were presented on the mobile device 102. The WEA data store 128 may comprise a data structure in system memory 118 and/or in the firmware 114 of the mobile device 102.

When the WEA client system 122 receives a WEA message 110, it may compare the identifying data of the received message 110 to the identifying data of messages previously recorded in the WEA data store 128, to determine whether the newly received message 110 is a duplicate of a message that was previously received and presented on the mobile device 102. For a duplicate WEA message 110 that was previously presented on the mobile device 102, the WEA client system 122 may be configured to disregard the message 110 so as not to present the same WEA message 110 a second time on the mobile device 102. However, for a WEA message 110 that either was not previously received at the mobile device 102, or is a duplicate of one or more previously received WEA messages 110 that were not presented on the mobile device 102, the WEA client system 122 may process the WEA message 110 using the techniques described herein (e.g., WEA configuration data 124 and/or location-based geofencing techniques) to determine whether the message 110 should be presented on the mobile device 102.

Additionally, when the WEA client system 122 presents a WEA message 110 on the mobile device 102, it also may add a record for the WEA message 110 into the WEA data store to prevent the message from being presented multiple times on the mobile device 102. The record stored in the WEA data store 128 for identifying a WEA message 110 may comprise a message identifier (ID) and/or serial number. The text (or other message content) of the WEA message 110 also may be stored in the WEA data store 128 and used for comparison with newly received messages to provide further reliability when checking for duplicate messages. Additionally or alternatively, the WEA message handler 116 within the firmware 114 also may perform an initial duplication checking process.

Figure 2:
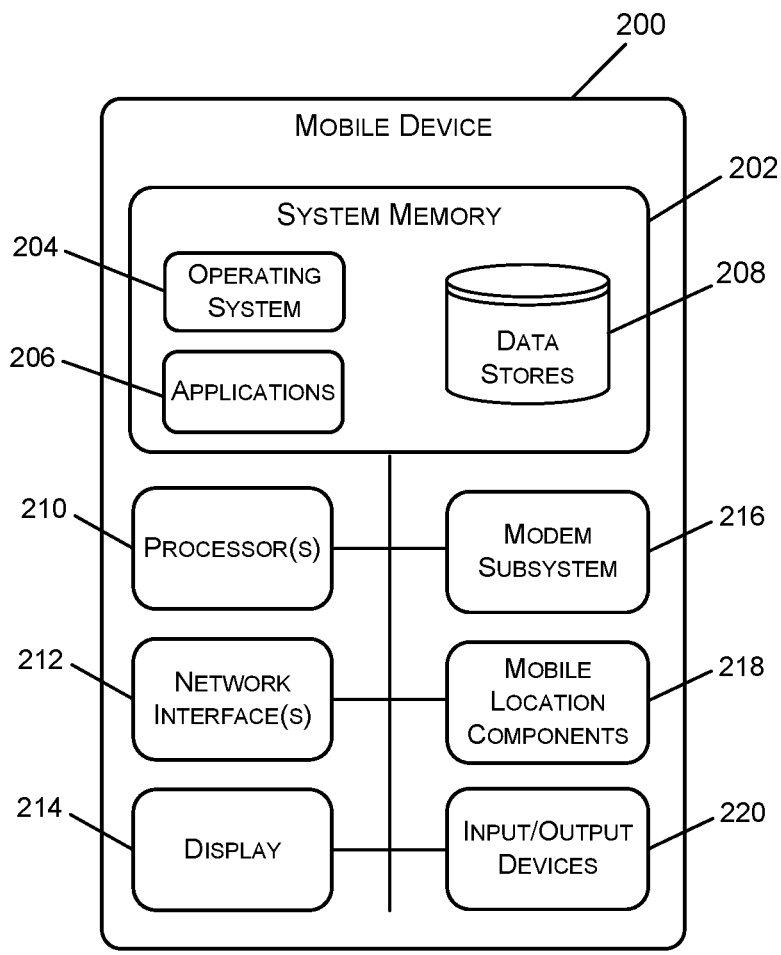
FIG. 2 is a block diagram illustrating an example mobile device that may be configured to implement certain techniques described herein.

FIG. 2 illustrates an example mobile device 200 that may be used to implement various techniques described herein. For example, processes 300, 500, and 700, described in more detail below, also may be implemented by a mobile device similar or identical to mobile device 200. Mobile device 200 also may be similar or identical to the mobile device 102 described above, and may illustrate an example implementation of mobile device 102 including additional components not shown in FIG. 1.

Mobile device 200 includes system memory 202 and a processing unit including one or more processors 210. The system memory 202 may include both volatile memory and non-volatile memory. The system memory 202 can also be described as non-transitory computer-readable media or machine-readable storage memory, and may include removable and non-removable media implemented in any method or technology for storage of information, such as computer executable instructions, data structures, program modules, or other data. Additionally, in some examples, the system memory 202 may include a SIM (subscriber identity module), which is a removable smart card used to identify a user of the mobile device 200 to a service provider network.

The system memory 202 may include, but is not limited to, RAM, ROM, EEPROM, flash memory or other memory technology, which can be used to store the desired information. The system memory 202 may in some cases include storage media used to transfer or distribute instructions, applications, and/or data. The system memory 202 of the mobile device 200 may also include memory of various hardware components of the device such as modem subsystems.

As shown in this example, the system memory 202 stores one or more sets of computer-executable instructions (e.g., software) such as programs that embody operating logic for implementing and/or performing desired functionality of the mobile device 200. The instructions may also reside at least partially within the processor(s) 210 during execution thereof by the mobile device 200. The instructions stored in the computer-readable storage media may include an operating system (OS) 204 that is also executed by the processor(s) 210, various applications 206 that also may be executed by the processor(s) 210, and data stores 208. The WEA client system 122 may be implemented as part of the operating system 204, applications 206, or other software stored by the system memory 202. The data stores 208 may include the WEA configuration data 124 and/or the WEA data store 128 described above in reference to FIG. 1.

In some embodiments, the processor(s) 210 may include a central processing unit (CPU), a graphics processing unit (GPU), both CPU and GPU, or other processing unit or component known in the art. Furthermore, the processor(s) 210 may include any number of processors and/or processing cores. The processor(s) 210 are configured to retrieve and execute instructions from the system memory 202.

The mobile device 200 may include one or more network interfaces 212, which may comprise any network interfaces known in the art. For instance, network interfaces 212 may include a Wi-Fi interface and/or a Bluetooth interface that performs the function of transmitting and receiving wireless communications using, for example, the IEEE 802.11, standards. Network interfaces 212 also may include a near field interface, which may comprise a Bluetooth® interface or radio frequency identifier (RFID) for transmitting and receiving near field radio communications via a near field antenna. For example, a near field interface may be used for functions, as is known in the art, such as communicating directly with nearby devices that are also, for instance, Bluetooth® or RFID enabled.

The mobile device 200 also may have a modem subsystem 216 for implementing wireless communication protocols such as Long-Term Evolution (LTE) and 5G New Radio (NR) radio access technologies. In some embodiments, the modem subsystem may be part of a System-on-a-Chip or may be implemented on one or more integrated circuits along with other cellular communication functionality.

As shown in this example, the mobile device 200 may comprise mobile location components 218 used to determine the current location of the mobile device 200 at any time. In various implementations, the mobile location components 218 may include a global positioning system (GPS) receiver and/or additional cellular locating components. GPS receiver(s) within the mobile location components 218 may receive signals from GPS satellites and use the signals to triangulate the current location of the mobile device 200. In some examples, mobile location components 218 may include additional components for WiFi-based and/or sim-based location technologies, which are designed to detect network access points and determine the location of the mobile device 200 based on the relative network signal strength of the network access points.

Additionally, the mobile device 200 may include a display 214, which may comprise a liquid crystal display or any other type of display commonly used in smartphones, tablets, and/or other mobile devices. For example, the display 214 may be a touch-sensitive display screen, which may also act as an input device or keypad, such as for providing a soft-key keyboard, navigation buttons, or the like.

The mobile device 200 also may include various input and output (I/O) devices 220. I/O devices 220 may include any combination of output devices known in the art, such as speakers, a vibrating mechanism, or a tactile feedback mechanism. I/O devices 220 may include ports for connection of one or more peripheral output devices, such as headphones, peripheral speakers, or a peripheral display. I/O devices 220 also may include any combination of input devices known in the art. For example, such input devices may include a microphone, a keyboard/keypad, mouse, or touch-sensitive display. A keyboard/keypad may be a push button numeric dialing pad (such as on a typical mobile device), a multi-key keyboard (such as a conventional QWERTY keyboard), or one or more other types of keys or buttons, and may also include a joystick-like controller and/or designated navigation buttons, or the like.

Figure 3:
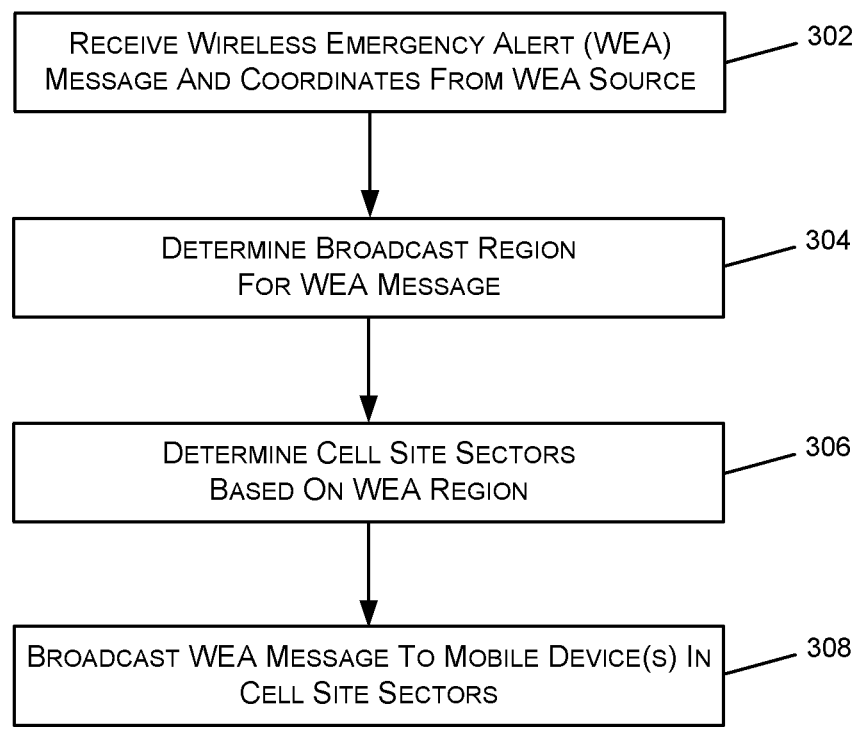
FIG. 3 illustrates an example process of broadcasting a Wireless Emergency Alert (WEA) message by a WEA system to mobile devices within cellular site sectors, in accordance with certain techniques described herein.

FIG. 3 is a flow diagram illustrating an example process 300 of broadcasting a Wireless Emergency Alert (WEA) message to mobile devices within a mobile device. Process 300 may be performed by a WEA system 130 within a core network 106 (e.g., at the entry point into the core network), or elsewhere within the cellular/mobile network.

At operation 302, the WEA system 130 receives a WEA message 110 from a WEA source 108. As described above, WEA messages 110 may include text notifications and/or other message content relating to weather events, evacuation notices, AMBER alerts, or alerts regarding national emergencies, as well as metadata relating the alert message.

At operation 304, the WEA system 130 determines a broadcast region for the WEA message 110. The broadcast region is the geographic region associated with the WEA message 110, and defines the area or region in which the WEA message 110 should be broadcast to mobile devices 102. In some examples, the WEA message 110 itself may include metadata defining the geographic region associated with the message 110. Additionally or alternatively, the WEA system 130 may receive the data defining the broadcast region separately from the WEA message 110. In still other examples, the WEA system 130 determine the appropriate broadcast region for the WEA message independently from the metadata of the WEA message 110 or any instructions received from the WEA source 108. As noted above, the geographic region associated with the WEA message 110 may be of any size and shape, including polygonal or non-polygonal shapes. The data defining the broadcast region may include data identifying the type or shape of the region (e.g., polygonal, circular, etc.), along with data defining the specific boundaries for the region. For instance, for polygonal shapes the data defining the broadcast region for the WEA message 110 may include the ordered set of vertices defining the polygon, while for circular shapes the data defining the broadcast region for the WEA message 110 may include the center point and radius of the circle, etc.

Figure 4:
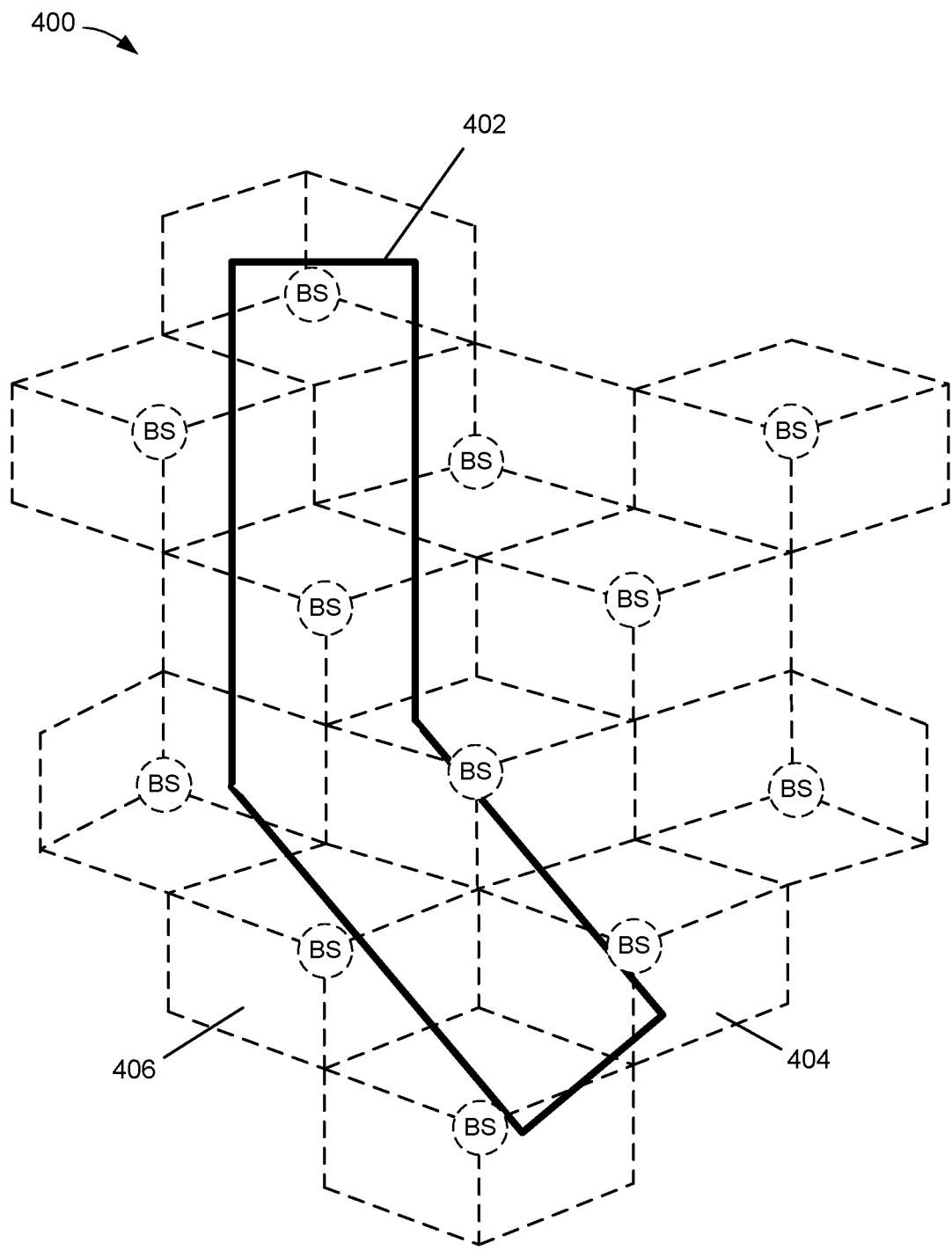
FIG. 4 is a diagram illustrating an example cellular site sector map and a geographic region associated with a Wireless Emergency Alert (WEA) message, in accordance with certain techniques described herein.

At operation 306, the WEA system 130 determines the cell site sectors for broadcasting the WEA message 110, based on the broadcast region for the WEA message 110 determined in operation 304. In some examples, the WEA system 130 may determine the cell site sectors to which the WEA message 110 is to be broadcast, by comparing the broadcast region determined at operation 304 to the cell site sector map for the mobile network. For instance, referring briefly to FIG. 4, an example cell site sector map 400 is shown for a mobile network. In this example, map 400 identifies a number of base stations, each base station having three associated sectors corresponding to 120-degree broadcast ranges from the base station antennas. Accordingly, the cell site sectors in this example are represented as dotted-line parallelograms (e.g., 404 and 406) around each base station ("BS") in the map. In other examples, it is contemplated that other sizes, shapes, and configurations of cell site sectors may be used depending on the architecture of the mobile network.

In this example, a boundary line defining a geographic region 402 is overlaid on the cell site sector map 400. The geographic region 402 may represent the broadcast region defining the area in which the WEA message 110 should be broadcast to mobile devices 102. Using the data from the cell site sector map 400, and the geographic region associated with a WEA message 110, the WEA system 130 can determine to which cell site sectors the WEA message 110 should be broadcast. In this example, the WEA system 130 may identify all sectors within the map 400 that overlap wholly or partially with any portion of the geographic region 402, as sectors to which the WEA message 110 should be broadcast. As shown in this example, sector 404 partially overlaps with the geographic region 402, and thus the WEA system 130 may select sector 404 for broadcasting the WEA message 110. In contrast, sector 406 does not overlap with the geographic region 402, and thus the WEA system 130 may determine that the WEA message 110 should not be broadcast to sector 406.

As noted above, although the geographic region 402 in this example is polygonal, in other examples geographic regions associated with WEA messages 110 may be any size and shape, including any polygonal shape or non-polygonal shape (e.g., circular, elliptical, etc.). Additionally, a WEA message 110 may be associated with multiple non-overlapping, or overlapping, geographic regions in some cases. In such cases, the WEA client system 122 may compare its current location to boundaries of each overlapping or non-overlapping geographic region plus the offset distance, or the boundaries of each geographic plus the offset distance after taking the union of all or some of the regions. For instance, when the WEA message 110 includes data defining more than one overlapping geographic region, the mobile device 102 may determine a union of the overlapping geographic regions, and use the location comparison techniques described herein to compare the location of the mobile device 102 against the union of the geographic regions. For all various cell site sector configurations and/or various geographic regions for WEA messages 110, the WEA system 130 may use similar or identical techniques of determining the cell sectors for broadcasting the WEA message 110 based on the overlap between any portion of the cell sectors and the geographic region(s) associated with the WEA message 110.

At operation 308, the WEA system 130 broadcasts the WEA message 110 via the particular cell site sectors determined in operation 306. As discussed above, the WEA system 130 may transmit the WEA message 110 via a one-way broadcast over the RAN 104, to any mobile device 102 operating within one of the determined cell sectors. Accordingly, in this example, any mobile device 102 operating within a cell sectors that overlaps the geographic region 402 defines for the WEA message 110 may receive the message 110, even if the mobile device 102 itself is not located within the geographic region 402.

Figure 5:
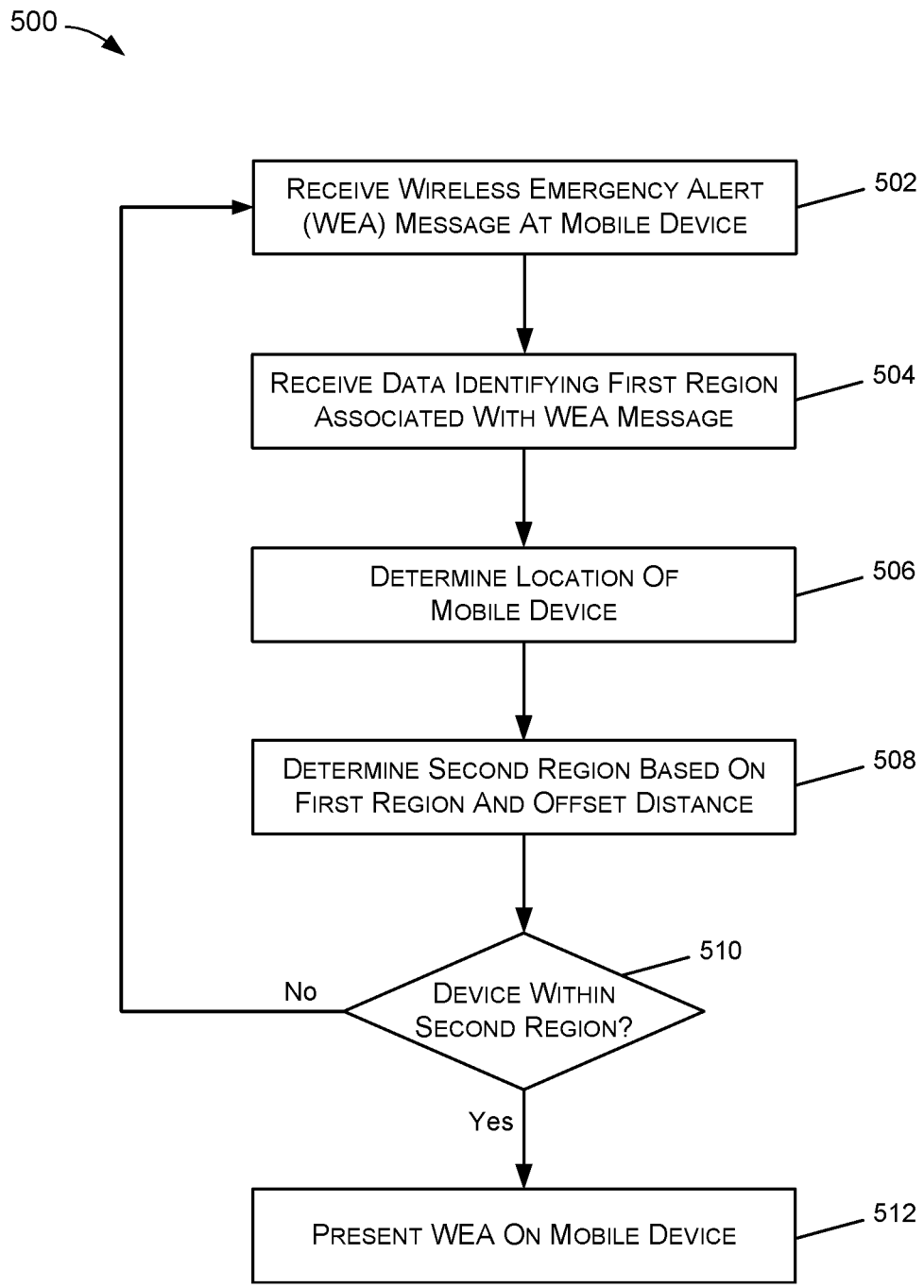
FIG. 5 illustrates an example process of receiving and presenting a Wireless Emergency Alert (WEA) message at a mobile device, in accordance with certain techniques described herein.

FIG. 5 is a flow diagram illustrating an example process 500 for receiving and presenting WEA messages 110 using geofencing techniques performed at a mobile device. Process 500 may be performed by various components of the mobile device 102, such as WEA client system 122, in response to WEA message 110 received from a WEA source 108 via the WEA system 130.

At operation 502, the mobile device 102 receives a WEA message 110 from the WEA source 108, over the core network 106 and/or RAN 104. The WEA message 110 may include text and/or other message content (e.g., images, video, web-based links, interactive content, etc.) for a broadcast alert notification. In some examples, the WEA message 110 also may include one or more items of metadata such as a message identifier, serial number, message type/classification, and/or timestamp. The WEA client system 122 may use the metadata for identifying and classifying the WEA message 110, and for detecting duplicate or repeat messages.

At operation 504, the WEA client system 122 of the mobile device 102 may receive data identifying a first geographic region associated with the WEA message 110 received at operation 502. The first geographic region may refer to the geographic region within which mobile devices 102 should present the WEA message 110. In some cases, the first geographic region defines the area of particular relevance for the alert condition that prompted the WEA message 110, so that mobile devices 102 within the region should present the message 110 to alert their users, while mobile devices 102 outside that region can disregard and not present the WEA message 110. The first geographic region associated with the WEA message 110 may include a region (or multiple regions) of any size, shape, and/or location within the mobile network.

Figure 6:
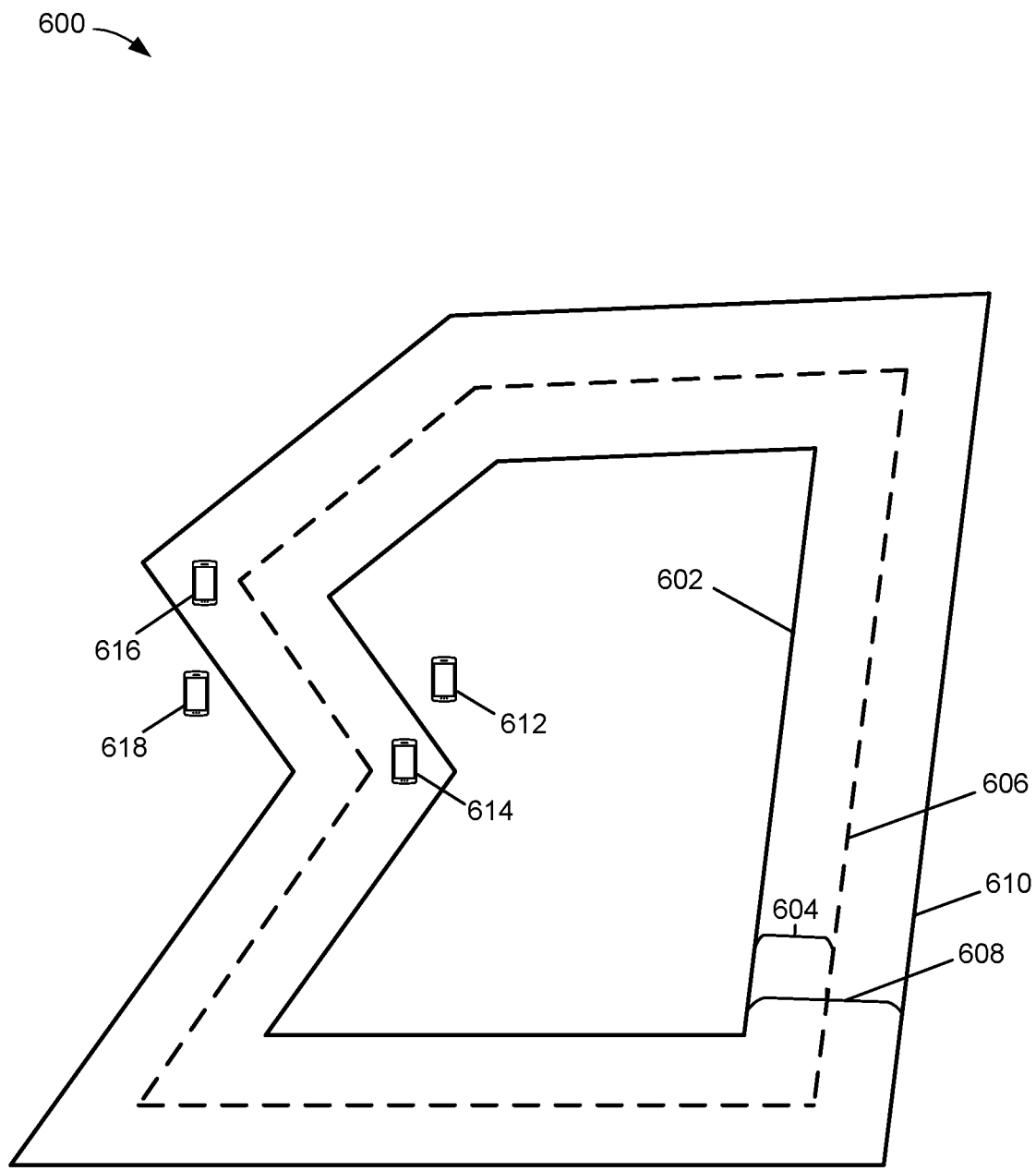
FIG. 6 is a diagram illustrating multiple geographic regions associated with a Wireless Emergency Alert (WEA) message, in accordance with certain techniques described herein.

Referring briefly to FIG. 6, an environment 600 (e.g., an area map) is shown including representations of multiple geographic regions associated with a WEA message 110. In this example, geographic region 602 may represent the first geographic region within which mobile devices 102 should present the WEA message 110.

In some examples, the data identifying the first geographic region may be included in the metadata of the WEA message 110 received at operation 502. For WEA messages 110 that include the first geographic region within the metadata, the structure of the metadata within the message 110 may depend on the type of the first geographic region. For example, the metadata of a WEA message 110 may include an ordered set of vertices (e.g., GPS coordinates) defining a polygonal region associated with the message 110. As another example, the metadata of a WEA message 110 may include a center point and radius defining a circular region associated with the message 110. In various other examples, the structure of the region metadata within a WEA message 110 may depend on the types or shape of the first geographic region associated with the WEA message 110, although for any shape the region metadata may define the size, shape and/or boundaries, and location of the first geographic region. In some cases, the data identifying the first geographic region may identify the region by referring to a legal or governmental jurisdiction (e.g., a city, county, or state, etc.), instead of or in addition to defining the region by shape size, and location. Additionally, in some examples, the WEA message 110 received by the mobile device 102 might not include coordinates defining a circle or polygon associated with the message. In such examples, the mobile device 102 may present the WEA message 110 based on the opt-in/out configuration settings of the mobile device 102, without applying the location-based geofencing techniques described herein.

As in the above example, the data identifying the first geographic region for a WEA message 110 may be included in the metadata of the message 110. In other examples, the mobile device 102 may receive the data identifying the first geographic region associated with the WEA message 110 separately from the message 110. For instance, the WEA client system 122 may receive a first message from the WEA source 108 including the text/content for a WEA message, and then a second message from the WEA source 108 (which may be sent and received before or after the first message) including the data identifying the first geographic region for the WEA message. In other examples, the WEA client system 122 may receive the text/content of a WEA message 110 from one system and the first geographic region associated with the WEA message 110 from a different system via a separate transmission.

At operation 506, the mobile device 102 determines its current location using one or more of the mobile location components 218. For instance, in response to receiving a WEA message 110 from the WEA message handler 116 within the firmware 114, the WEA client system 122 may activate the GPS receiver of the mobile device 102 to determine the current device location. Additionally or alternatively, the WEA client system 122 may perform one or more cellular locating techniques (e.g., WiFi-based location, sim-based location, etc.) to determine the current location of the mobile device 102.

In some examples, the WEA client system 122 also may determine confidence values and/or confidence ranges associated with the location determinations of operation 506. A confidence value may refer to a likelihood that the mobile device 102 is within a predetermined distance of the determined location. For instance, the WEA client system 122 may determine a N % confidence value for a location determination, indicating that there is a N % likelihood that the mobile device 102 is within a predetermined distance threshold (e.g., D meters) of the location coordinates (X, Y) determined for the mobile device 102. Similarly, a confidence range may refer to the distance from the determined location within which the mobile device 102 is located, with a predetermined confidence or likelihood. For instance, the WEA client system 122 may determine a N meter confidence range for a location determination, indicating that there is a P % likelihood that the mobile device 102 is within N meters of the determined location coordinates (X, Y).

When confidence values and/or confidence ranges are determined for the location determination of the mobile device 102, the WEA client system 122 may use the confidence values/ranges for processing the WEA message 110. For instance, the WEA client system 122 may compare the confidence values/ranges to one or more thresholds to determine a low level of confidence in the accuracy of the location determination. In some examples, if the WEA client system 122 determines the confidence level of the location determination is below a threshold, then it may determine that the WEA message 110 should be presented regardless of whether the determined location for the mobile device 102 is inside or outside of the first geographic region. In other examples, if the WEA client system 122 determines the confidence level of the location determination is below a threshold, then it may initiate an additional location determination, using the same and/or different mobile location techniques (e.g., GPS or cellular location technologies), to obtain an updated location data for the mobile device 102. Additionally, the WEA client system 122 may use the confidence level of the location determination in operation 506 to determine an offset distance, transgression parameter, and/or second geographic region for the WEA message 110, as discussed in more detail below.

At operation 508, the WEA client system 122 of the mobile device 102 may determine a second geographic region associated with the WEA message 110 received at operation 502. The second geographic region may be a larger region that encompasses the first geographic region determined in operation 504. In some examples, the WEA client system 122 may determine the second geographic region based on the first geographic region associated with the WEA message 110, and an offset distance. The WEA client system 122 may use the second geographic region and the device location from operation 506, as described below, to determine whether or not the mobile device 102 should present the WEA message 110.

In various examples, the WEA client system 122 may receive or determine the offset distance in operation 508. The WEA client system 122 may use the offset distance to determine the larger second geographic region, based on the first geographic region identified in operation 504. For instance, the second geographic region may be larger than the first geographic region, by a distance equal to the offset distance around the entire perimeter of the first geographic region.

In some examples, the WEA source 108, WEA system 130, and/or other external system may transmit a numeric value representing the offset distance to the mobile device 102. In other examples, offset distance may be stored in the firmware 114 or system memory 118 of the mobile device 102, and the WEA client system 122 may retrieve the offset distance from the firmware 114 or system memory 118 in operation 508.

The offset distance received by WEA client system 122 in operation 508 may be associated with a particular WEA message 110, or may apply to multiple WEA messages 110. For example, the metadata of a WEA message 110 may include an offset distance applicable to the specific WEA message 110. In other examples, the WEA client system 122 may store an offset distance value received from an external system (e.g., WEA source 108, WEA system 130, etc.), or retrieved from an internal memory (e.g., firmware 114, system memory 118, etc.), and apply the offset distance value to multiple WEA messages 110 received by the mobile device 102. In some implementations, the WEA client system 122 may receive or determine different offset distances corresponding to different types/classifications of WEA messages 110. For instance, WEA messages 110 for weather alerts may have a first offset distance, WEA messages 110 with evacuation notices may have a second offset distance, WEA messages 110 with AMBER alerts may have a different third offset distance, etc.

Referring again to FIG. 6, span 604 represents the offset distance, and the geographic region 606 represents the second geographic region. As shown in this example, the first geographic region 602 and second geographic region 606 may be concentric regions, where the second geographic region 606 is larger than first geographic region 602 by the length of the offset distance 604 on all sides.

In some implementations, the WEA client system 122 may determine or calculate the offset distance in operation 508 based on a transgression parameter. In such examples, the transgression parameter defines the permissible overshoot distance for a WEA message 110. The WEA source 108 and/or WEA system 130 may use the transgression parameter to convey to the mobile devices 102 the distance outside of the first geographic region beyond which WEA messages 110 should not be presented on the mobile devices 102.

Referring again to FIG. 6, span 608 represents the distance of the transgression parameter, and the geographic region 610 represents a third geographic region outside of both the first and second geographic regions. As shown in this example, the first, second, and third geographic regions may be concentric regions, where the third geographic region 610 is larger than first geographic region 602 by the length of the transgression parameter on all sides. In this example, mobile devices within the first geographic region 602 (e.g., mobile device 612) should present the WEA message 110, mobile devices outside of first geographic region 602 but within the third geographic region 610 (e.g., mobile devices 614 and 616) need not but may permissibly present the WEA message 110, and mobile devices outside the third geographical region 610 (e.g., mobile device 618) should not present the WEA message 110.

In various examples, the WEA client system 122 may receive the transgression parameter from an external system, such as the WEA source 108 or WEA system 130. Additionally or alternatively, the WEA client system 122 may retrieve the transgression parameter from the firmware 114 or system memory 118 of the mobile device 102. In some cases, the WEA client system 122 may apply the same transgression parameter to all WEA messages 110 received at the mobile device 102. In other cases, the WEA client system 122 may receive and apply different transgression parameters for different WEA messages 110 and/or types/classifications of WEA messages 110. For instance, the WEA client system 122 may apply a first transgression parameter to WEA messages 110 for weather alerts, a second transgression parameter to WEA messages 110 including evacuation notices, a third transgression parameter to WEA messages 110 including AMBER alerts, etc.

Certain examples described herein represent the transgression parameter as a constant distance value that defines when overshoot of a WEA message 110, beyond the first geographic region associated with the message 110, has occurred. For instance, if a mobile device 102 outside of the first geographic region by a distance greater than the transgression parameter presents the WEA message 110, than an overshoot error has occurred. In other examples, the transgression parameter need not be a constant distance value, but may be represented as a percentage. For instance, a transgression parameter of N % may indicate that the overshoot distance for the WEA message 110 (e.g., the third geographic region 610) may be calculated as N % of the distance between a center point and the outer boundary of the first geographic region. In other examples, the transgression parameter need not be a constant distance value, but may be represented multiple different values and/or an equation, so that the overshoot distance for the WEA message 110 may be different on different sides or surfaces of the first geographic region. Further, in some implementations the WEA client system 122 may receive data defining the boundaries of the overshoot geographic region (e.g., the third geographic region 610) instead of receiving the transgression parameter.

As noted above, the WEA client system 122 may use the transgression parameter to calculate the offset distance in operation 508. In some examples, the WEA client system 122 may compute the offset distance as one-half the distance of the transgression parameter. For instance, referring again to FIG. 6, the WEA client system 122 may receive the value of the transgression parameter (span 608), and may calculate the offset distance (span 604) as one-half the transgression parameter.

Although the WEA client system 122 may calculate the offset distance as half the transgression parameter as in the above example, other techniques may be used to calculate the offset distance in other examples. For instance, calculating the offset distance as one-half of the transgression parameter may codify two assumptions: that location determination errors by the mobile device 102 are equally likely in all directions, and that the negative effects of undershoot errors (e.g., failing to present a WEA message 110 at a mobile device 102 within the first geographic region) are equal to the negative effects of overshoot errors (e.g., presenting a WEA message 110 at a mobile device 102 outside the first geographic region by more than distance of the transgression parameter). If either the location errors by the mobile device 102 are not equally likely in all directions, or if the negative effects of overshoot errors and undershoot errors are not the same, then the WEA client system 122 may implement a different calculation of the offset distance in operation 508. For instance, to implement an updated policy that overshoot errors are more tolerable than undershoot errors, the WEA client system 122 may update the calculation of the offset distance by increasing the multiplier from 0.5 (e.g., one-half of the transgression parameter) to a larger multiplier (e.g., 0.6, 0.7, 0.8, 0.9, etc.). In this example, the larger multiplier increases the offset distance used by the WEA client system 122, making undershoot errors less likely and overshoot errors more likely. Similarly, to implement an updated policy that undershoot errors are more tolerable than overshoot errors, the WEA client system 122 may update the calculation of the offset distance by decreasing the 0.5 multiplier to a smaller multiplier (e.g., 0.1, 0.2, 0.3, 0.4, etc.), thereby decreasing the offset distance, making undershoot errors more likely and overshoot errors less likely.

Additionally, different mobile devices 102 may be configured to perform different offset distance calculations in some implementations. For example, the WEA client system 122 may calculate the offset distance in operation 508 based on one or more multipliers or weights values retrieved from the WEA configuration data 124. The WEA configuration data 124 may include a user-configurable offset distance that may override the transgression parameter, and/or a weight value that the WEA client system 122 may use to weight the transgression parameter.

Further, in some examples, the WEA client system 122 may use the confidence values and/or ranges associated with device location determination in operation 506, to calculate the offset distance in operation 508. For instance, when a confidence values or range indicates a high-level of confidence in the accuracy of the device location determination (e.g., the confidence value meets or exceeds a threshold, or the confidence range is lower than a range threshold), then the WEA client system 122 may decrease the multiplier used to compute the offset distance. Using the decreased multiplier, the WEA client system 122 computes a decreased offset distance, bringing the boundaries of the second geographic region closer to the first. This example illustrates further improvements to the functioning of the mobile device 102, by using the WEA client system 122 to decrease the number of overshoot errors when determining high-levels of confidences for the device location determinations. Similarly, the WEA client system 122 may increase the multiplier used to compute the offset distance in response to determine high-levels of confidences for the device location determinations, thereby decreasing number of overshoot errors when determining low-levels of confidence in the device location determinations.

At operation 510, the WEA client system 122 compares the location of the mobile device 102 determined in operation 506, to the second geographic region determined in operation 508. Referring again to FIG. 6, in this example the comparison in operation 510 corresponds to determining whether the mobile device is within the second geographic region 606. As discussed above, the second geographic region 606 represents a larger region encompassing the first geographic region 602 on all sides by the offset distance 604. If the determined location for the mobile device (e.g., for mobile devices 612 and 614) is within the second geographic region 606 (510:Yes), then in operation 512 the WEA client system 122 may present the WEA message 110 on the mobile device and/or may record the presenting of the WEA message 110 (see, e.g., FIG. 7). In contrast, if the determined location for the mobile device (e.g., for mobile devices 616 and 618) is not within the second geographic region 606 (510:No), then the WEA client system 122 does not present the WEA message 110 on the mobile device.

In some examples, the WEA client system 122 may perform operations 510 and/or 512 based on various WEA configuration data 124, as well as based on the location-based geofencing techniques described above. For instance, the WEA client system 122 may perform the determination of operation 510 in conjunction with additional determinations for presenting WEA messages 110 based on the WEA configuration data 124. As noted above, the WEA configuration data 124 includes additional criteria and/or user preferences for determining whether to present WEA messages 110 based on the current status or other processes running on the mobile device 102, the date or time at which the message was received, the message type or classification, the current user of the mobile device, etc.

Figure 7:
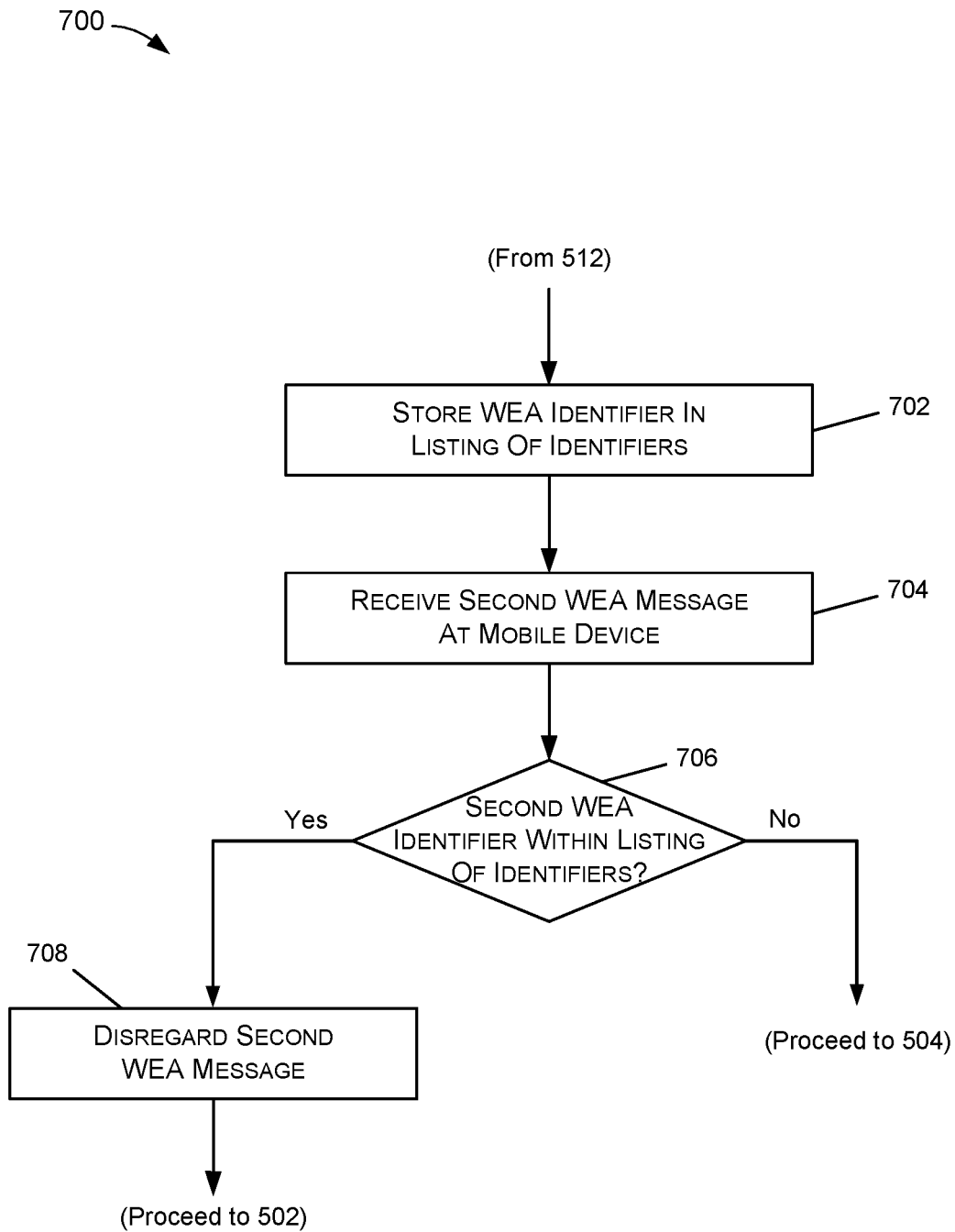
FIG. 7 illustrates another example process of receiving and presenting a Wireless Emergency Alert (WEA) message at a mobile device, in accordance with certain techniques described herein.

FIG. 7 is a flow diagram illustrating another example process 700 for receiving and presenting WEA messages 110 at a mobile device. As shown in this example, process 700 may be performed in conjunction with process 500, by the WEA client system 122 and/or other components of the mobile device 102.

In this example, operation 702 may be performed following operation 512, described above, during which the WEA client system 122 presents the WEA message 110 on the mobile device 102. At operation 702, the WEA client system 122 stores one or more identifiers associated with the WEA message 110 within a listing of identifiers. For instance, the WEA client system 122 may access a listing of WEA message identifiers stored within the WEA data store 128. The WEA message identifier(s) stored in operation 702 may be unique identifier(s) based on the message identifier, serial number, timestamp, message content (e.g., text), and/or any other data associated with the WEA message 110 presented on the mobile device 102. As this example illustrates, in some implementations the WEA client system 122 may store WEA message identifier(s) for messages 110 that were received and presented on the mobile device 102, but not for messages 110 that were received by the mobile device 102 but were not presented. For instance, if a WEA message 110 was received by a mobile device 102, but the WEA client system 122 determined not to present the message 110 based on the geofencing techniques described herein (e.g., 510:No), then the WEA message 110 would not be stored in the listing of WEA messages in operation 702.

At operation 704, the mobile device 102 receives a second WEA message 110. Operation 704 may be similar or identical to operation 502, describe above. For instance, in operation 704 the mobile device 102 may receive the WEA message 110 from the WEA source 108 via the mobile network (e.g., core network 106 and RAN 104). The WEA message 110 may include message content (e.g., text) and various metadata as described above. In some implementations, a WEA source 108 may broadcast a single WEA message 110 to a geographic region multiple times, such as in scenarios in which high-priority WEA messages 110 broadcasted periodically or repeated to the geographic region, until the message notification is no longer relevant to that geographic area. Accordingly, the second WEA message 110 received in operation 704 may be a duplicate of a WEA message 110 previously received at the mobile device 102.

At operation 706, the WEA client system 122 determines whether an identifier for the second WEA message 110 is present within the listing of identifiers. To perform the determination in operation 706, the WEA client system 122 may retrieve or generate one or more message identifier(s) for the second WEA message 110 received at operation 704, and compare the new message identifier(s) to the listing of message identifiers stored in the WEA data store 128. To ensure the accuracy of the comparison, the WEA client system 122 may perform the same techniques for extracting or generating message identifiers in operations 702 and 706. In this example, the WEA client system 122 may find the identifier for the second WEA message 110 within the listing of identifiers in the WEA data store 128 (706:Yes), if the second WEA message 110 is a duplicate of a WEA message 110 previously received by the mobile device 102, and if the previous received WEA message 110 was presented by the mobile device 102. In this cases, process 700 proceeds to operation 708, in which the WEA client system 122 disregards and does not present the second WEA message 110 on the mobile device 102, and then proceeds to operation 502 to await additional WEA messages 110 that may be received by the mobile device 102.

If either the second WEA message 110 received at operation 704 is not a duplicate of a previous WEA message 110, or if the second WEA message 110 is a duplicate but the previous WEA message 110 was not presented at the mobile device 102, then the WEA client system 122 will not find an identifier for the second WEA message 110 in the listing of identifiers (706:No). In this case, process 700 may proceed to operation 504 for the second WEA message 110, and perform the additional operations in process 500 to determine whether to present the second WEA message 110 on the mobile device 102.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed (or may be omitted entirely), and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims

What is claimed is:

1. A method comprising:
receiving a first emergency alert message at a mobile device;
receiving first data at the mobile device, the first data identifying a first region associated with the first emergency alert message;
determining second data based at least in part on the first data and an offset distance, the second data identifying a second region;
determining a location of the mobile device;
comparing the location of the mobile device to the second region;
in response to determining that the location of the mobile device is within the second region, presenting the first emergency alert message on the mobile device;

storing, in a listing of identifiers on the mobile device, a first identifier of the first emergency alert message, wherein a second identifier of a second emergency alert message is not stored in the listing of identifiers, the second emergency alert message being an emergency alert message that was received but not presented on the mobile device;

receiving a third emergency alert message at the mobile device;

comparing a third identifier of the third emergency alert message to listing of identifiers; and processing the third emergency alert message based at least in part on comparing the third identifier to the listing of identifiers.

2. The method of claim 1, wherein the first data comprises a set of coordinates defining a polygon.

3. The method of claim 1, further comprising:
receiving a transgression parameter; and
calculating the offset distance based at least in part on the transgression parameter.

4. The method of claim 3, further comprising:
determining a confidence range associated with the location of the mobile device,
wherein calculating the offset distance is based at least in part on the confidence range.

5. The method of claim 1, wherein determining the location of the mobile device comprises at least one of:
receiving a satellite signal via a GPS receiver of the mobile device; or
receiving data from a network access point via a wireless network interface of the mobile device.

6. The method of claim 1, further comprising:
receiving the second emergency alert message at the mobile device;
receiving third data at the mobile device, the third data identifying a third region associated with the second emergency alert message;
determining fourth data based at least in part on the third data and the offset distance, the fourth data identifying a fourth region;
determining a second location of the mobile device;
comparing the second location of the mobile device to the fourth region; and
in response to determining that the second location of the mobile device is not within the fourth region, determining that the second emergency alert message is not to be presented on the mobile device.

7. A mobile device, comprising:
one or more processors; and
one or more non-transitory computer-readable media storing computer-executable instructions that, when executed by the one or more processors, cause the one or more processors to perform operations comprising:
receiving a first emergency alert message;
receiving first data identifying a first region associated with the first emergency alert message;
receiving a transgression parameter, wherein the transgression parameter defines a permissible overshoot distance associated with the first emergency alert message;
calculating an offset distance based at least in part on the transgression parameter;
determining second data based at least in part on the first data and the offset distance, the second data identifying a second region;

determining a location of the mobile device;
comparing the location of the mobile device to the second region; and
in response to determining that the location of the mobile device is within the second region, presenting the first emergency alert message on the mobile device.

8. The mobile device of claim 7, wherein the first data defines a polygon in an environment.

9. The mobile device of claim 7, the operations further comprising:
determining a confidence range associated with the location of the mobile device,
wherein calculating the offset distance is based at least in part on the confidence range.

10. The mobile device of claim 7, wherein determining the location of the mobile device comprises at least one of:
receiving a satellite signal via a GPS receiver of the mobile device; or
receiving data from a network access point via a wireless network interface of the mobile device.

11. The mobile device of claim 7, the operations further comprising:
receiving a second emergency alert message at the mobile device;
receiving third data at the mobile device, the third data identifying a third region associated with the second emergency alert message;
determining fourth data based at least in part on the third data and the offset distance, the fourth data identifying a fourth region;
determining a second location of the mobile device;
comparing the second location of the mobile device to the fourth region; and
in response to determining that the second location of the mobile device is not within the fourth region, determining that the second emergency alert message is not to be presented on the mobile device.

12. The mobile device of claim 11, the operations further comprising:
storing, in a listing of identifiers on the mobile device, a first identifier of the first emergency alert message, wherein a second identifier of the second emergency alert message is not stored in the listing of identifiers;
receiving a third emergency alert message at the mobile device;
comparing a third identifier of the third emergency alert message to listing of identifiers; and
processing the third emergency alert message based at least in part on comparing the third identifier to the listing of identifiers.

13. One or more non-transitory computer-readable media storing instructions executable by one or more processors, wherein the instructions, when executed, cause the one or more processors to perform operations comprising:
receiving a first emergency alert message at a mobile device;
receiving first data at the mobile device, the first data identifying a first region associated with the first emergency alert message;
receiving a transgression parameter;
determining an offset distance based at least in part on the transgression parameter;
determining second data based at least in part on the first data and the offset distance, the second data identifying a second region;

determining a location of the mobile device;

comparing the location of the mobile device to the second region; and in response to determining that the location of the mobile device is within the second region, presenting the first emergency alert message on the mobile device.

14. The one or more non-transitory computer-readable media of claim 13, wherein the first data comprises a set of coordinates defining a polygon.

15. The one or more non-transitory computer-readable media of claim 13, the operations further comprising:

determining a confidence range associated with the location of the mobile device, wherein determining the offset distance is based at least in part on the confidence range.

16. The one or more non-transitory computer-readable media of claim 13, wherein determining the location of the mobile device comprises at least one of:

receiving GPS data; or receiving network data.

17. The one or more non-transitory computer-readable media of claim 13, the operations further comprising:

receiving a second emergency alert message at the mobile device;

receiving third data at the mobile device, the third data identifying a third region associated with the second emergency alert message;

determining fourth data based at least in part on the third data and the offset distance, the fourth data identifying a fourth region;

determining a second location of the mobile device;

comparing the second location of the mobile device to the fourth region; and in response to determining that the second location of the mobile device is not within the fourth region, determining that the second emergency alert message is not to be presented on the mobile device.

\* \* \* \* \*